3,809,611
PROCESS FOR PRODUCING CITRIC ACID
Kenichiro Takayama, Machida, and Tomoko Tomiyama, Tokyo, Japan, assignors to Kyowa Hakko Kogyo Co., Ltd., Tokyo, Japan
No Drawing. Filed Jan. 11, 1973, Ser. No. 322,724
Claims priority, application Japan, Jan. 13, 1972, 47/5,524
Int. Cl. C12d 1/04
U.S. Cl. 195—30                                  5 Claims

ABSTRACT OF THE DISCLOSURE

Citric acid is produced by culturing *Candida zeylanoides* No. 19–5 ATCC 20347 in a nutrient medium containing acetic acid as the main carbon source. Citric acid and/or isocitric acid is accumulated in the nutrient medium and is thereafter recovered.

---

The present invention relates to a process for the production of citric acid and/or isocitric acid from acetic acid using a certain strain of yeast.

Citric acid is an important chemical used in medicines, flavoring agent, foods and as a water-conditioning agent and detergent builder among others.

Production of citric acid by fermentation has a long history. A well-established process comprises culturing a fungus such as *Aspergillus niger* in a medium containing a carbohydrate as the carbon source. In these years, many attempts have been made to produce citric acid by culturing a yeast in a medium containing a normal paraffin as the carbon source. This process is successful in obtaining a high yield of citric acid from a cheap material as reported in, for example, U.S. Pat. 3,689,539 wherein more than 100 mg./ml. of citric acid is accumulated.

Recently, with the progress of petrochemical industries, the production cost of acetic acid has been reduced and, as the result, acetic acid has been used as a raw material for the fermentative production of amino acids such as glutamic acid, lysine and the like.

As a raw material for fermentation process, acetic acid has many advantages. Acetic acid can be produced in a very stable quality, therefore, the control of a fermentation using such acetic acid is easy. Moreover, since acetic acid is soluble in water, the recovery of the metabolic product and the microbial cells from a liquor of fermentation using acetic acid is easier compared with that from a liquor of normal paraffin fermentation. Further, the metabolic product and the microbial cells from the fermentation using acetic acid are considered to be less problematic in toxicy than those from the normal paraffin fermentation.

In spite of the above advantages, however, as far as the use of acetic acid as the raw material for the production of citric acid, little attention has been paid. In British Pat. 1,199,700, there is a disclosure that isocitric acid is produced from acetic acid by culturing a Candida strain, however, in this process citric acid is recognized just as a by-product. In French Pat. No. 2,035,420, which is assigned to the assignee of the present invention, *Candida zeylanoides* ATCC 15585 accumulates 12 mg./ml. of citric acid and 10 mg./ml. of isocitric acid in a medium to which total of 5% acetic acid is fed.

The present inventors have conducted various mutation inductions on *Candida zeylanoides* ATCC 15585 to improve its ability to produce citric acid. As the result, the present inventors have isolated a mutant *Candida zeylanoides* No. 19–5, which has an improved ability of converting acetic acid into citric acid and/or isocitric acid. This mutant has been deposited with the American Type Culture Collection, Rockville, Md., and has been accorded the accession number of ATCC 20347.

In accordance with the present invention, *Candida zeylanoides* No. 19–5 ATCC 20347 is cultured in a nutrient medium containing acetic acid as the main source of carbon. Citric acid and/or isocitric acid is formed and accumulated in the culture medium and is recovered therefrom by a conventional method.

Culturing of *Canida zeylanoides* ATCC 20347 in accordance with the present invention is carried out in any known manner and in a medium which may be either natural or synthetic. As a carbon source, acetic acid, the salts thereof such as the sodium salt, ammonium salt, calcium salt, etc. or the esters thereof such as the ethyl ester, methyl ester, etc. are used. In order to promote the growth of the strain at an initial stage of fermentation, glucose, glycerin, normal paraffins, etc. may be added to the medium in a ratio of 1% to 2% (w./v. or v./v.) as the carbon source in addition to acetic acid. Particularly, the addition of glycerin has been found to improve the yield of citric acid and/or isocitric acid.

It is desirable to control the concentration of the acetic acid in the medium so that it is not detrimentally high at the initiation of culturing. This is accomplished by adding acetic acid incrementally to the medium.

As a nitrogen source, ammonium chloride, ammonium sulfate, ammonium nitrate, ammonium phosphate, ammonium acetate, etc. may be used. As an inorganic material, potassium dihydrogenphosphate, magnesium sulfate, copper sulfate, sodium chloride, calcium chloride, etc. may be used. In addition, thiamine, biotin, yeast extract, corn steep liquor, meat extract, peptone, etc. may be added as growth promoting agents. These natural organic materials may also be used as a source of nitrogen.

It is preferred that the stain be initially grown in a seed medium prior to being used to inoculate the main culture medium. The seed medium is incubated under favorable growth conditions to develop a suitable organism population, typically for about 24 hours. The seed medium is then used to inoculate the main culture medium.

Culturing is carried out under aerobic conditions at a temperature of 15° to 40° C. and at a pH of 3 to 7. If necessary, the pH is adjusted with calcium carbonate, calcium hydroxide, sodium hydroxide or the like. Usually, culturing is completed in 2 to 5 days and a considerable amount of citric acid and isocitric acid is formed and accumulated in the culture liquor.

After the completion of the culturing, citric acid and isocitric acid are isolated by conventional means. For example, the microbial cells are removed from the fermentation liquor and the resultant liquor is concentrated in a known manner. Citric acid and isocitric acid are isolated and recovered from the concentrate by precipitation in the form of the calcium salt or sodium salt by utilizing the differences in solubility.

Practice of certain specific embodiments of the invention is illustrated by the following representative examples.

EXAMPLE 1

In this example, *Candida zeylanoides* ATCC 20347 is cultured on a malt extract agar slant at 30° C. for 24 hours. The resultant culture is inoculated into a 250 ml.-Erlenmeyer flask provided with baffle plates containing 20 ml. of a seed medium having the following composition:

| | G./dl. |
|---|---|
| Glucose | 2 |
| Calcium acetate | 0.5 |
| $NH_4Cl$ | 0.3 |
| $KH_2PO_4$ | 0.05 |
| $MgSO_4 \cdot 7H_2O$ | 0.05 |
| Yeast extract | 0.2 |
| pH 5.5. | |

Culturing is carried out with shaking at 30° C. for 24 hours. The thus obtained seed culture is inoculated in a ratio of 10% (v./v.) into a 250 ml.-Erlenmeyer flask provided with baffle plates containing 20 ml. of a fermentation medium having the following composition:

| | | |
|---|---|---|
| Glucose | g./dl. | 2 |
| Calcium acetate monohydrate | g./dl. | 3 |
| $NH_4Cl$ | g./dl. | 0.3 |
| $KH_2PO_4$ | g./dl. | 0.05 |
| $MgSO_4 \cdot 7H_2O$ | g./dl. | 0.05 |
| $MnSO_4 \cdot 4H_2O$ | mg./l. | 1 |
| Thiamine | μg./l. | 100 |
| $CaCO_3$ | g./dl. | [1]1 |
| pH 5.5. | | |

[1] Separately sterilized.

Fermentation is carried out with shaking at 30° C. After 48 hours and 72 hours from inoculation, additional sterilized calcium acetate monohydrate is added to the fermentation medium in such amount as to maintain the concentration thereof in the medium at 3 g./dl. At the completion of fermentation, 15.2 mg./ml. of citric acid and 10.0 mg./ml. of isocitric acid, respectively in the form of the calcium salts, are obtained while a total of 60 mg./ml. (90 mg./ml. as the calcium salt) of acetic acid is used.

When the parent strain *Candida zeylanoides* ATCC 15585 is cultured in the same manner, 10.5 mg./ml. of citric acid and 11.5 mg./ml. of isocitric acid are produced.

EXAMPLE 2

In this example, *Candida zeylanoides* ATCC 20347 is cultured on a malt extract agar slant at 30° C. for 24 hours. The resultant culture is inoculated into a 250 ml.-Erlenmeyer flask provided with baffle plates containing 20 ml. of a seed medium having the following composition:

| | | |
|---|---|---|
| Normal paraffins | ml./dl. | 2 |
| Glycerin | g./dl. | 1 |
| Ammonium acetate | g./dl. | 0.5 |
| $KH_2PO_4$ | g./dl. | 0.05 |
| $MgSO_4 \cdot 7H_2O$ | g./dl. | 0.05 |
| $FeSO_4 \cdot 7H_2O$ | mg./l. | 5 |
| $MnSO_4 \cdot 4H_2O$ | mg./l. | 2 |
| Thiamine | μg./l. | 100 |
| $CaCO_3$ | g./dl. | [1]1 |
| pH 5.5. | | |

[1] Separately sterilized.

Culturing is carried out with shaking at 30° C. for 24 hours. The thus obtained seed culture is inoculated in a ratio of 10% (v./v.) into a 250 ml.-Erlenmeyer flask provided with baffle plates containing 20 ml. of a fermentation medium having the same composition as the seed medium. Fermentation is carried out with shaking at 30° C. After 40 hours, fermentation is continued while feeding a 30% acetate buffer solution or 30% acetic acid solution to the medium keeping the pH of the medium at 5 to 6. After 96 hours of fermentation, 48 mg./ml. of citric acid and 18 mg./ml. of isocitric acid are accumulated while 85 mg./ml. of acetic acid is used.

EXAMPLE 3

In this example, *Candida zeylanoides* ATCC 20347 is cultured on a malt extract agar slant at 30° C. for 24 hours. The resultant culture is inoculated into a 250 ml.-Erlenmeyer flask provided with baffle plates containing 20 ml. of a seed medium having the following composition:

| | | |
|---|---|---|
| Glucose | g./dl. | 2 |
| Glycerin | g./dl. | 1 |
| Ammonium acetate | g./dl. | 0.5 |
| $KH_2PO_4$ | g./dl. | 0.05 |
| $MgSO_4 \cdot 7H_2O$ | g./dl. | 0.05 |
| $FeSO_4 \cdot 7H_2O$ | mg./l. | 5 |
| $MnSO_4 \cdot 4H_2O$ | mg./l. | 2 |
| Thiamine | μg./l. | 100 |
| $CaCO_3$ | g./dl. | [1]1 |
| pH 5.5. | | |

[1] Separately sterilized.

Culturing is carried out with shaking at 30° C. for 24 hours. The thus obtained seed culture is inoculated in a ratio of 10% (v./v.) into a 250 ml.-Erlenmeyer flask provided with baffle plates containing 20 ml. of a fermentation medium having the same composition as the seed medium. Fermentation is carried out with shaking at 30° C. After 40 hours, fermentation is continued while feeding a 30% acetate buffer solution or 30% acetic acid solution to the medium keeping the pH of the medium at 5 to 6. After 96 hours of fermentation, 40 mg./ml. of citric acid and 15 mg./ml. of isocitric acid are accumulated while 80 mg./ml. of acetic acid is used.

EXAMPLE 4

In this example, *Candida zeylanoides* ATCC 20347 is cultured on a malt extract agar slant at 30° C. for 24 hours. The resultant culture is inoculated into a 2 l.-Erlenmeyer flask provided with baffle plates containing 200 ml. of a seed medium having the following composition:

| | G./dl. |
|---|---|
| Glucose | 2 |
| Calcium acetate | 0.5 |
| $NH_4Cl$ | 0.3 |
| $KH_2PO_4$ | 0.05 |
| $MgSO_4 \cdot 7H_2O$ | 0.05 |
| Yeast extract | 0.2 |
| pH 5.5. | |

Culturing is carried out with shaking at 30° C. for 24 hours. The thus obtained seed culture is inoculated in a ratio of 10% (v./v.) into a 30 l. jar fermenter containing 15 l. of a fermentation medium having the following composition:

| | | |
|---|---|---|
| Glucose | g./dl. | 2 |
| Calcium acetate monohydrate | g./dl. | 3 |
| $NH_4Cl$ | g./dl. | 0.3 |
| $KH_2PO_4$ | g./dl. | 0.05 |
| $MgSO_4 \cdot 7H_2O$ | g./dl. | 0.05 |
| $MnSO_4 \cdot 4H_2O$ | mg./l. | 1 |
| Thiamine | μg./l. | 100 |
| $CaCO_3$ | g./dl. | [1]1 |
| pH 5.5. | | |

[1] Separately sterilized.

Fermentation is carried out with aeration and agitation at 30° C. During fermentation, additional sterilized calcium acetate monohydrate is added to the fermentation medium in such amount as to maintain the concentration thereof in the medium at 3 g./dl. At the completion of fermentation, 66 mg./ml. of citric acid and 30 mg./ml. of isocitric acid, respectively in the form of the calcium salts, are obtained while a total of 188 mg./ml. (270 mg./ml. as the calcium salt) of acetic acid is used.

EXAMPLE 5

In this example, *Candida zeylanoides* ATCC 20347 is cultured on a malt extract agar slant at 30° C. for 24 hours. The resultant culture is inoculated into a 2 l.-Erlenmeyer flask provided with baffle plates containing 200 ml. of a seed medium having the following composition:

| | | |
|---|---|---|
| Normal paraffins | ml./dl | 2 |
| Glycerin | g./dl | 1 |
| Ammonium acetate | g./dl | 0.5 |
| $KH_2PO_4$ | g./dl | 0.05 |
| $MgSO_4 \cdot 7H_2O$ | g./dl | 0.05 |
| $FeSO_4 \cdot 7H_2O$ | mg./l | 5 |
| $MnSO_4 \cdot 4H_2O$ | mg./l | 2 |
| Thiamine | µg./l | 100 |
| $CaCO_3$ | g./dl | [1] 1 | pH 5.5.

[1] Separately sterilized.

Culturing is carried out with shaking at 30° C. for 24 hours. The thus obtained seed culture is inoculated in a ratio of 10% (v./v.) into a 30 l. jar fermenter containing 15 l. of a fermentation medium having the same composition as the seed medium. Fermentation is carried out with aeration and agitation at 30° C. After 40 hours, fermentation is continued while feeding a 30% acetate buffer solution or 30% acetic acid solution to the medium keeping the pH of the medium at 5 to 6. After 96 hours of fermentation, 168 mg./ml. of citric acid and 72 mg./ml. of isocitric acid are accumulated while 400 mg./ml. of acetic acid is used.

EXAMPLE 6

In this example, *Candida zeylanoides* ATCC 20347 is cultured on a malt extract agar slant at 30° C. for 24 hours. The resultant culture is inoculated into a 2 l.-Erlenmeyer flask provided with baffle plates containing 200 ml. of a seed medium having the following composition:

| | | |
|---|---|---|
| Normal paraffins | ml./dl | 2 |
| Glycerin | g./dl | 1 |
| Ammonium acetate | g./dl | 0.5 |
| $KH_2PO_4$ | g./dl | 0.05 |
| $MgSO_4 \cdot 7H_2O$ | g./dl | 0.05 |
| $FeSO_4 \cdot 7H_2O$ | mg./l | 5 |
| $MnSO_4 \cdot 4H_2O$ | mg./l | 2 |
| Thiamine | µg./l | 100 |
| $CaCO_3$ | g./dl | [1] 1 | pH 5.5.

[1] Separately sterilized.

Culturing is carried out with shaking at 30° C. for 24 hours. The thus obtained seed culture is inoculated in a ratio of 10% (v./v.) into a 30 l. jar fermenter containing 15 l. of a fermentation medium having the same composition as the seed medium. Fermentation is carried out with shaking at 30° C. After 40 hours, fermentation is continued while feeding a 30% acetate buffer solution or 30% acetic acid solution to the medium keeping the pH of the medium at 5 to 6. After 96 hours of fermentation, 84 mg./ml. of citric acid and 35 mg./ml. of isocitric acid are accumulated while 203 mg./ml. of acetic acid is used.

What is claimed is:

1. A process for producing citric acid which comprises aerobically culturing *Candida zeylanoides* ATCC 20347 in a nutrient medium containing acetic acid as the main source of assimilable carbon, accumulating citric acid and isocitric acid in said medium and recoveriing said citric acid and isocitric acid.

2. A process according to claim 1 wherein culturing is carried out at a temperature of between 15° C. and 40° C. and at a pH of from 3 to 7.

3. A process according to claim 1 wherein said acetic acid is introduced incrementally into said nutrient medium during said culturing step.

4. A process according to claim 1 wherein said acetic acid is introduced into said medium in the form of the salt thereof.

5. A process according to claim 1 wherein said acetic acid is introduced into said medium in the form of the ester thereof.

References Cited

UNITED STATES PATENTS 3,669,839  6/1972  Fried _____ 195—30

ALVIN E. TANENHOLTZ, Primary Examiner

U.S. Cl. X.R.

195—37